United States Patent [19]
Staniszewski

[11] Patent Number: 5,815,933
[45] Date of Patent: Oct. 6, 1998

[54] GUIDING MEANS, FOR A CIRCULAR SAW BASE PLATE

[76] Inventor: Tadeusz Staniszewski, 33 Karen Pl., Budd Lake, N.J. 07828

[21] Appl. No.: 792,702

[22] Filed: Jan. 29, 1997

[51] Int. Cl.⁶ ..................................................... B27B 9/04
[52] U.S. Cl. .............................................. 30/376; 30/374
[58] Field of Search ............................ 30/373, 375, 376, 30/374; 83/574, 455, 614, 468.4

[56] References Cited

U.S. PATENT DOCUMENTS

| | | | |
|---|---|---|---|
| 2,676,624 | 4/1954 | Gecmen | 30/373 |
| 3,485,275 | 12/1969 | Boudreau | 30/376 |
| 3,586,077 | 6/1971 | Pease | 30/376 |
| 4,051,597 | 10/1977 | Cardoza | 30/373 |
| 4,078,309 | 3/1978 | Wilson | 30/375 |
| 4,202,233 | 5/1980 | Larson | 30/376 |
| 4,624,054 | 11/1986 | Edwards | 30/374 |
| 4,777,726 | 10/1988 | Flowers | 30/374 |

*Primary Examiner*—Hwei-Siu Payer
*Attorney, Agent, or Firm*—Bernard J. Murphy

[57] ABSTRACT

A guide, serving as a platform for a portable, electric circular saw and the saw base plate, presents a trackway in which, slidably, to receive the base plate, and removably mounts a channel element, thereunder, for abuttingly receiving a workpiece, that is a piece of lumber, against the element for cutting by the saw. In one embodiment, the channel element disposes the lumber for cross-cutting. In another embodiment, the channel element disposes the lumber for rip-sawing. The platform is selectively mounted to a support, in inverted attitude, for converting the circular saw to a table saw.

5 Claims, 5 Drawing Sheets

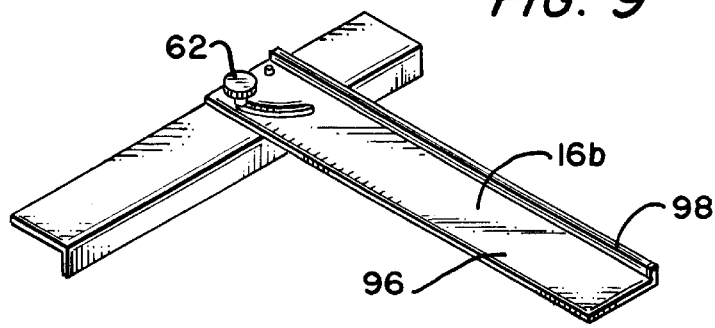
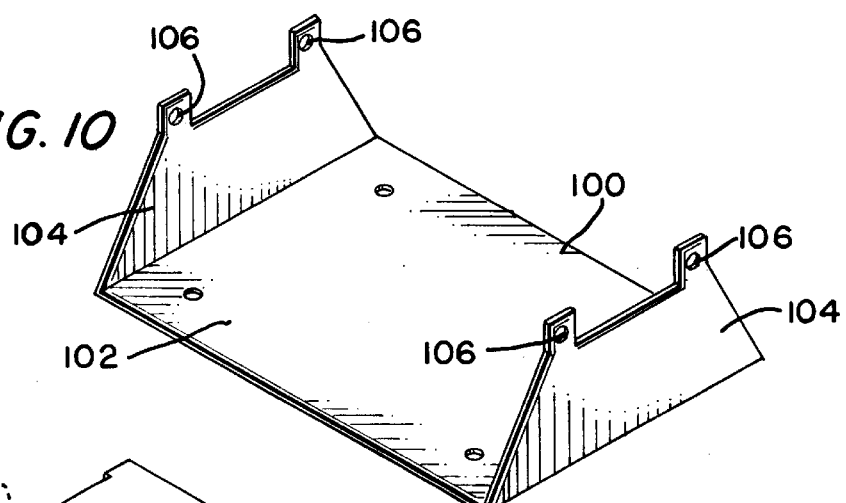
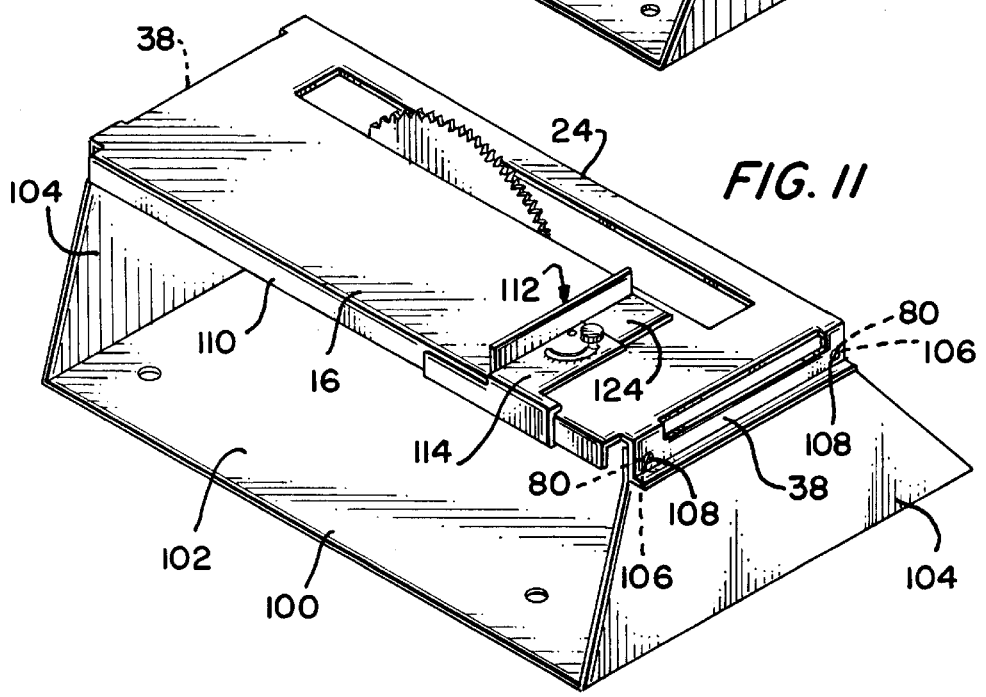

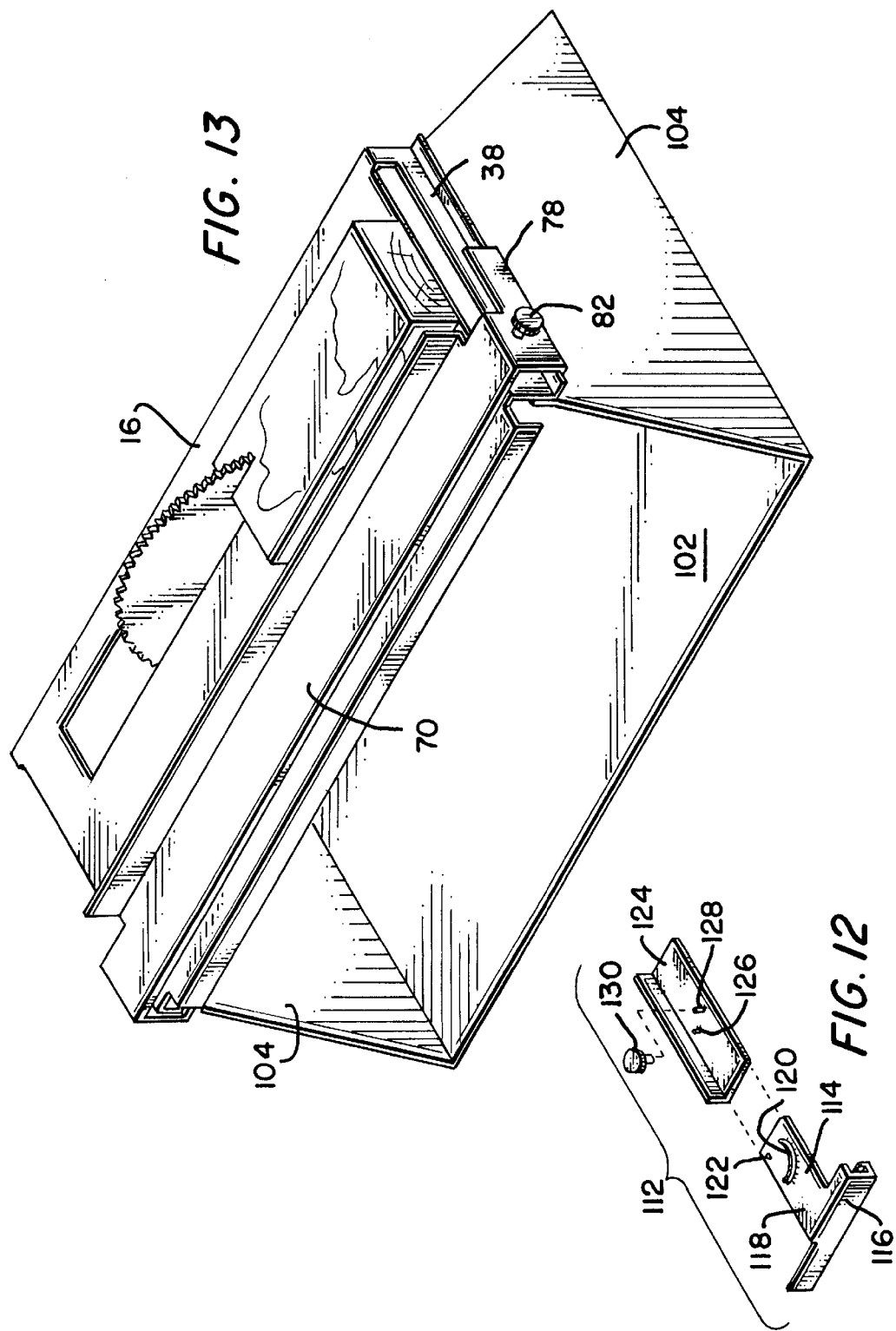

GUIDING MEANS, FOR A CIRCULAR SAW BASE PLATE

This invention pertains to power tools, and in particular to circular saws having base plates and means for guiding such base plates, in which the base plates have parallel linear surfaces susceptible of use for guiding purposes.

Circular saws, especially hand-held, electric, circular saws, are of especial utility in construction and home shop activities, but they require some measure of skill in cutting lumber as one can tilt or cant the blade and produce an irregular cut edge. Too, the user must keep the blade on an unvarying, straight travel, to yield a truly straight cut along a pencil-marked indication.

There has been a long-felt need for some sort of guide, which can receive a hand-held, electric, circular saw, and cause the same to move in an unerring, linear travel as it severs lumber. Equally needed has been some manner of guide which can incorporate means for converting a hand-held, electric, circular saw to a table saw.

It is an object of this invention to set forth the very guiding means which is sorely needed, by disclosing a guiding means, for a circular saw base plate which has means defining a pair of parallel, linear surfaces, comprising an elongate guide; wherein said guide has an upper, planar surface for slidable movement of said base plate thereupon; said guide further has trackway means for (a) slidably engaging both of said linear surfaces, (b) guiding said linear surfaces in a translating travel thereof lengthwise of said guide, and (c) preventing lateral displacement of said linear surfaces from said trackway means; and elongate means, coupled to and underlying said planar surface of said guide, for abuttingly receiving a workpiece thereagainst and therealong, for processing of said workpiece by a circular saw coupled to said base plate.

It is also an object of this invention to set forth the aforesaid guiding means wherein said guide comprises a platform; said base plate has a circular saw integral therewith; and means, coupled to said platform, for converting said circular saw to a table saw.

Further objects of this invention, as well as the novel features thereof, will become apparent by reference to the following description, taken in conjunction with the accompanying figures, in which:

FIG. 3 is a perspective illustration, again, of the novel guiding means in which, however, now it is modified for the rip-cutting of a workpiece;

FIG. 9 shows substantially only the trackway embodiment which is usable with the base plate of FIG. 8;

FIG. 10 is a perspective view of the support which is used to convert the circular saw to a table saw;

FIG. 11 shows the support of FIG. 10 in place, supporting the platform thereupon; and FIG. 12 is an exploded view of the channel subassembly used for guiding a workpiece on the inverted platform for cross-cutting; and FIG. 13 shows the inverted platform, on the support, and modified for facilitating a rip-cutting of a workpiece.

Figure 1:
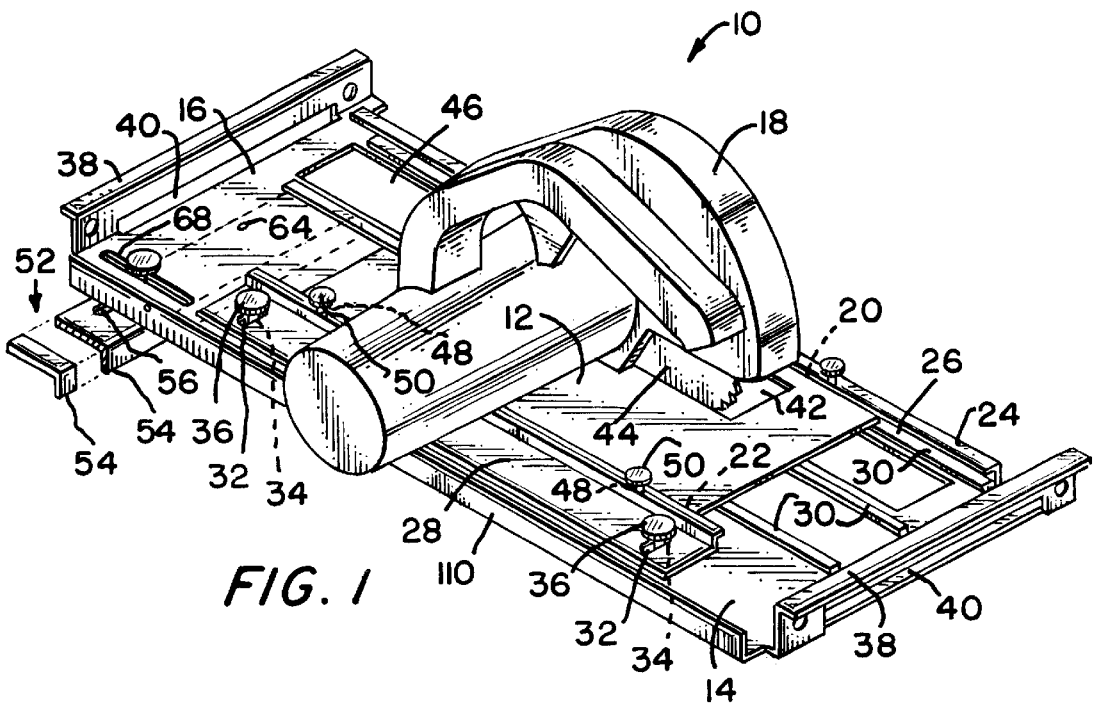
FIG. 1 is a perspective illustration of the invention, according to an embodiment thereof.
Figure 2:
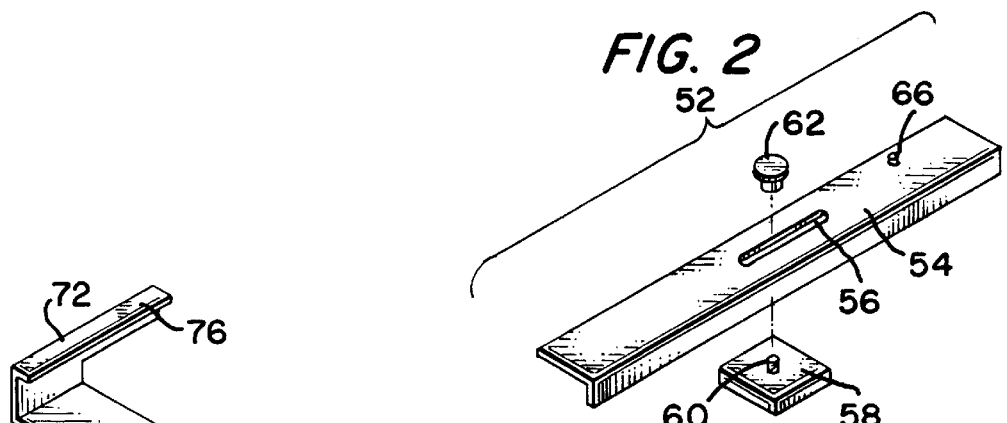
FIG. 2 is a perspective, exploded view of the workpiece-receiving channel subassembly which, in FIG. 1, is shown in place under the platform, for steadying a workpiece for cross-cutting thereof.

As shown in FIGS. 1 and 2, the novel guiding means 10 for a circular saw base plate 12 comprises an elongate guide 14 which constitutes a platform 16. The base plate 12, of course, has a conventional, hand-held, electric circular saw 18 integral therewith. Consequently, as the inventive guiding means 10 is defined as means for guiding the base plate 12, the end purpose thereof is the guiding of the circular saw 18, self-evidently.

The base plate 12 has a pair of parallel, linear surfaces 20 and 22, the same being the side edges of the plate 12, and these are used, in conjunction with a trackway borne by the platform 16, for the straight, linear guidance of the base plate and saw 18. Integral with one side 24 of the platform 16 is a U-shaped channel 26; it slidably receives the edge-surface 20. The edge-surface 22 is likewise slidably received in a channel 28, of right-angular cross-section, which is adjustably fastened to the platform 16. The platform 16 has strips 30 of polytetrafluorethylene material adhered thereto, to facilitate a free slidable movement of the base plate 12 thereupon. Channels 26 and 28, together, comprise a trackway for the linear, edge-surfaces 20 and 22. Channel 28 has a pair of slots 32 formed therein, and the platform 16 has tapped holes 34 (FIG. 1) formed therein to receive headed screws 36. By manipulation of the screws 36, the channel 28 can be made slidable, sideways, to permit the base plate 12 to be removed from the platform 16. As shown, in FIG. 1, the base plate 12 is captive on the platform 16, at the sides of the plate 12. At opposite ends of the platform 16 are barriers 38, the same being integral with the platform 16, and each barrier has an elongate opening 40 formed therein which permit opposite ends of the base plate 12 to protrude therethrough; in this way, the reciprocable travel of the base plate and saw 18 can stroke further than otherwise would be possible. Even so, the upright portions of the barriers 38 cause the housing of the saw 18 to impinge thereagainst, whereby the travel extent of the saw and base plate is ultimately limited. The base plate 12 has the conventional void 42 formed therein, though which the blade 44 of the saw 18 may protrude. So also, the platform 16 has a similar void 46 to accommodate the blade 44.

Channels 26 and 28, in uppermost portions thereof, have tapped holes 48 (FIG. 1) formed therein. Additional headed screws 50 are engaged with the holes 48, and are used, as required, to lock the base plate against travel along the platform 16, by tightening the screws 50 against the base plate 12. A workpiece -receiving channel subassembly 52, shown in isolation and exploded view in FIG. 2, is receivably coupled to, and underlying, the bottom surface of the platform 16. Subassembly 52 comprises a length of right-angularly-formed structure 54 which has a linear slot 56 formed therein. A rectilinear block 58, having a threaded stud 60 rising therefrom penetrates the slot 56 and is secured to the underside of the structure 54 by a headed nut 62. Additionally, the structure 54 has a small dowel 46 extending therefrom via the upper surface thereof. Correspondingly, the platform has a small hole 64 formed therein to receive the dowel 66 rotatably therein. The platform 16 has an axially-directed slot 68 formed therein for bisecting the slot 56 in the structure 54. As can be discerned in FIG. 1, the stud 60 penetrates both slots 56 and 68. Clearly then, it can be seen that the cooperation of the slots 56 and 68 and dowel 66 permit an angulation of the structure 54 relative to the platform 16. As shown in FIG. 1, the structure 54 is disposed for abuttingly receiving thereagainst a workpiece, i.e., a piece of lumber, for the crosscutting thereof by the blade 44, right-angularly. If the nut 62, slots 56 and 68 and dowel 66 are used to angulate the structure 54, the workpiece can be cut thereacross at some, selected and variable angle.

As noted in the foregoing, the openings 40 formed in the barriers 38, permit the ends of the base plate 12 to protrude therethrough. Too, as described, the channels 26 and 28 capture the sides of the base plate 12. The barriers 38, then, with the openings 40, and the channels 26 and 28, comprise means for preventing removal of the base plate 12 and saw 18 from the platform 16. This is an especially noteworthy safety feature of the invention. Too, this feature has a particular utility when the circular saw 18 is converted into a table saw, by the invention, as is explained in detail in the ensuing text.

Figure 4:
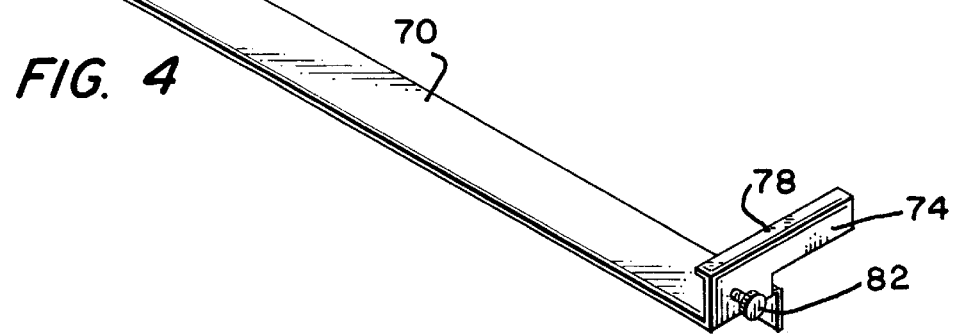
FIG. 4 depicts the rip-cutting-accommodating channel which is fitted to the platform as shown in FIG. 3.

The novel guiding means 10 can be modified for the rip-cutting of lumber, with a minimal of change, and this is depicted in FIGS. 3 and 4. In FIG. 3, which is substantially the same as FIG. 1, the subassembly 52 is removed, and replaced by the channel element 70 shown in FIG. 4. Channel element 70 comprises a right-angularly formed piece having hangers 72 and 74 at opposite ends thereof. Hanger 72 has a lip 76 which clasps the top of the one barrier 38, and the other hanger 74 has a lip 78 which clasps the top of the other barrier 38, but in addition, it locks onto the platform 16. The barriers 38 have threaded holes 80 formed therein, and a headed screw 82, as can be seen in FIG. 3, threadedly engages a threaded hole 80 in one barrier 38. Channel element 70, like subassembly 52, underlies the planar, slidable surface of the platform 16, and presents its depending, right-angular portion for abuttingly receiving the piece of lumber which is to be ripped by the saw 18.

Figure 5:
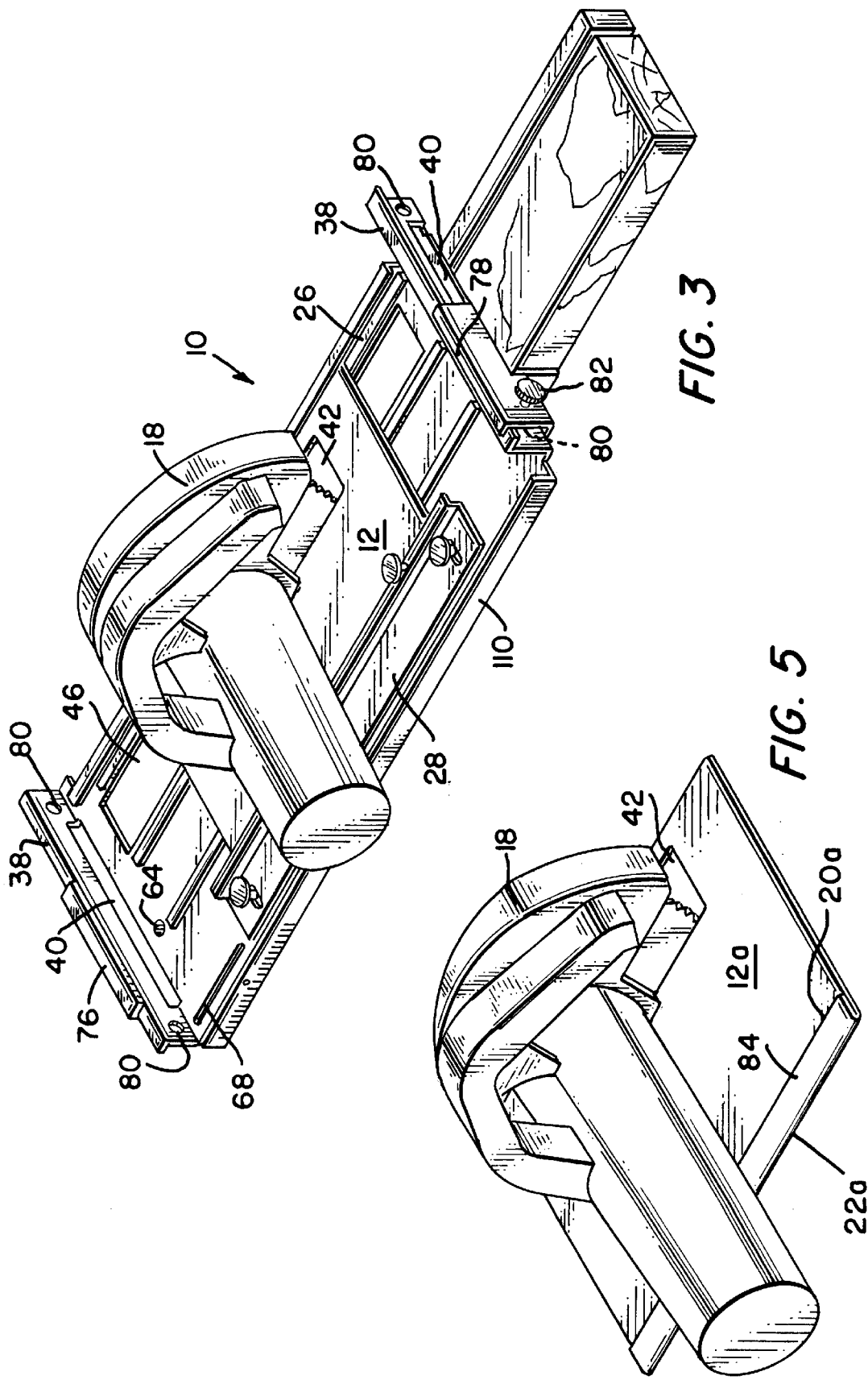
FIG. 5 depicts a hand-held circular saw with an integral base plate, the same having a folded-over leaf which defines the guiding-using parallel, linear surfaces.
Figure 6:
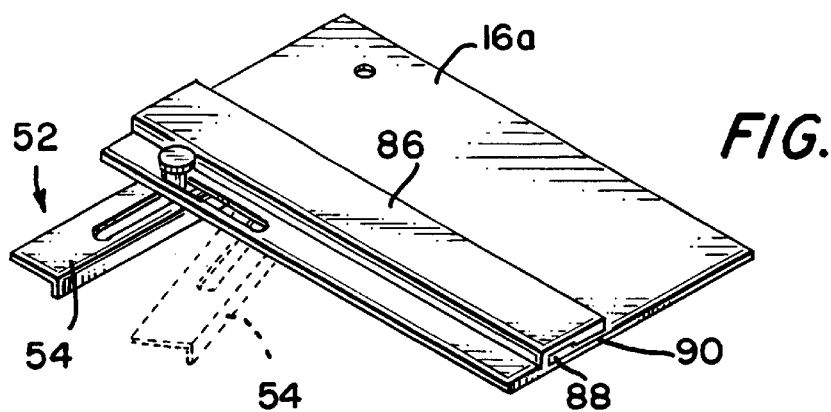
FIG. 6 illustrates only a portion of a platform in which the trackway means is altered from that shown in FIG. 1.
Figure 7:
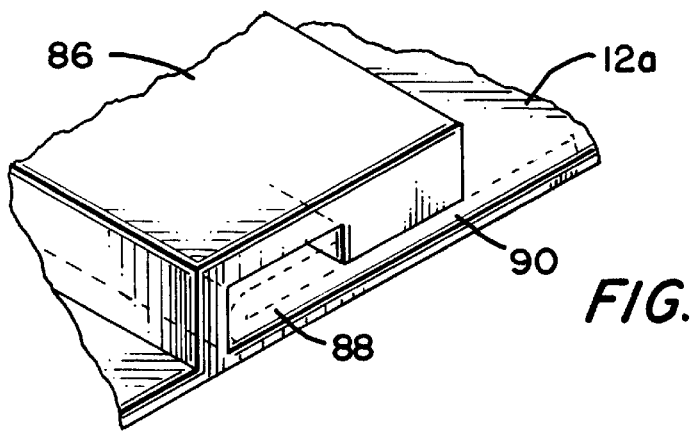
FIG. 7 is a fragmentary illustration, in enlargement, showing how the folded-over leaf and the trackway of FIG. 6 cooperate to guide the base plate and circular saw in true, linear travel.

FIGS. 5, 6 and 7 illustrate an alternative embodiment of the invention. Herein, the base plate 12*a* of the saw 18 has a folded-over leaf 84. The leaf 84 comprises means for defining the basic pair of linear and parallel surfaces which are used for reciprocably guiding the base plate 12*a* and the saw 18 in a straight travel. The outermost edge 22*a* of the base plate (opposite the saw blade side) comprises one of the guiding surfaces, and the inwardly extending, folded-over edge 20*a* is the other of the parallel surfaces. To accommodate this modified base plate 12*a*, the platform 16*a* (only a portion thereof being shown here), has a modified trackway. Here, the trackway comprises an elongate ledge 86, which is integral with the platform 16*a*, the ledge 86 having a walled passageway 88 formed thereunder. As seen in greater scale, in FIG. 7, the ledge 86 and the planar surface of the platform 16*a* cooperatively define a slotted space 90 therebetween; the lengthwise running space 90 permits the slidable travel therethrough of the single thickness of the base plate 12*a*.

Figure 8:
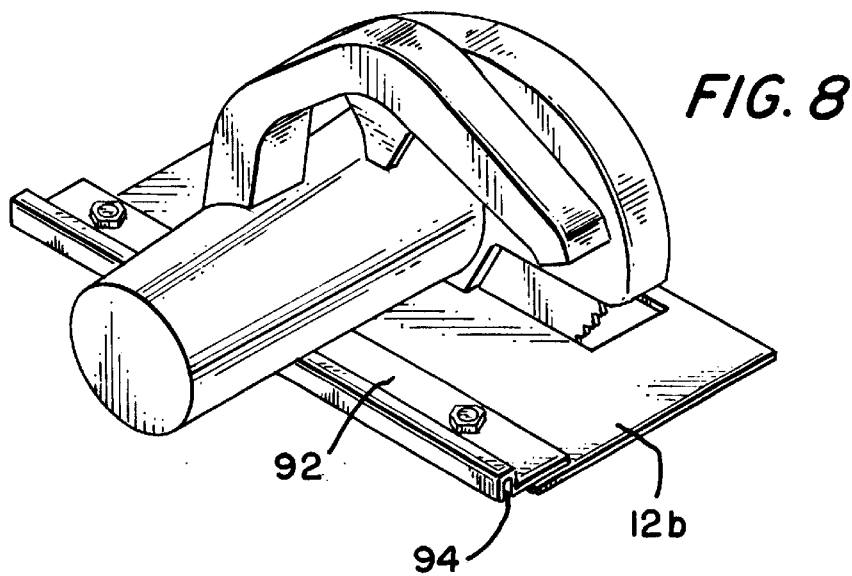
FIG. 8 shows a circular saw, and base plate, in which the means defining the pair of parallel, linear surfaces, for engaging a trackway, is an element, having a U-shaped portion, removably fastened to a side edge of the base plate.

FIGS. 8 and 9 also illustrate another alternative embodiment of the invention. FIG. 8 shows a base plate 12*b* which has removably fastened thereto an elongate element 92 which has a U-shaped edge 94. Correspondingly, the mating platform 16*b*, only a rudimentary portion thereof being shown here, comprises an elongate panel 96 which has a raised rail 98 for slidably receiving the U-shaped edge 94 of the base plate 12*b*. The "U" of the U-shaped edge 94 defines the guiding, linear surfaces.

The aforesaid FIGS. 1 through 9, and the foregoing, relevant description thereof, disclose the singular versatility of the basic platform, and for these purposes this has reference to the platform 16 as shown, fully, in FIGS. 1 and 3. Yet, the invention comprises even more versatility for the platform, as the same has a function in converting the basic circular saw of FIGS. 1 through 9, to a table saw. This singular novelty is detailed in the ensuing figures, FIGS. 10, 11 and 12.

In FIG. 10 is depicted a platform 100, the same comprising a base 102 and a pair of upstanding limbs 104. Uppermost ends of the limbs 104 have boreholes 106 formed therein which are threaded to receive screws. Now, as shown in FIG. 11, the platform 16 is inverted, and the holes 80 which are formed in the barriers 38 align with the holes 106 in the limbs 104; then screws 108 are fixed in the holes 80 and 106 to secure the platform 16 securely upon the platform 100.

As configured, now, in FIG. 11, the invention has taken the form of a table saw, and the platform 16 presents a rail for the reciprocable guidance of a workpiece-engaging pusher or channel subassembly. Priorly, it was cited that the platform 16 had a U-shaped channel 26 at one side 24 thereof; the same is shown in FIGS. 1 and 3. In addition, however, the platform 16 also has an upstanding rail 110 formed at the side thereof opposite side 24. The rail 110 defines a guiding trackway for the channel subassembly or pusher 112 shown in FIG. 11, in place, and in FIG. 12, in exploded view. Pusher 112 comprises a substantially T-shaped component 114. Component 114 has, at the one end thereof a partially U-shaped slide 116, and this slide engages and moves along the rail 110. The remaining stem portion 118 of the component 114 has an arcuate slot 120, and a pivot pin hole 122. The pusher 112, in addition, has a channel piece 124, of right-angular cross-section, with a pivot pin 126 and a threaded stud 128. The channel piece 124 is fitted under the stem portion 118, to align the pin 126 with the pivot pin hole 122, and to have the stud 128 penetrate the slot 120. Finally, a headed nut 130 is secured onto the protruding portion of the stud 128. Self-evidently, the nut 130 can be loosened to permit the channel piece 124 to angulate, in order that the saw 18, now a table saw, can cut a workpiece, i.e., a piece of lumber, at some chosen angle.

FIG. 11 shows the table saw arranged for the cross-cutting of lumber. This table saw configuration of the invention can also perform rip-cutting. The arrangement of the table saw for rip-cutting is illustrated in FIG. 13. In this arrangement, the priorly-presented, channel element 70 (earlier shown in FIG. 4) is employed again, as described in connection with the FIG. 4 deployment.

While I have described my invention, in connection with specific embodiments of the invention, it is to be clearly understood that this is done, only by way of example, and not as a limitation to the scope of the invention as set forth in the objects thereof, and in the appended claims

I claim:

1. Guiding means, for a circular saw base plate which has means defining a pair of parallel, linear surfaces, comprising:

an elongate guide; wherein
   said guide has an upper, planar surface;
   said planar surface comprises means for (a) accommodating a slidable movement of said base plate directly thereupon, and (b) enabling linear, relative movement, between said base plate and said planar surface, during operative working of a circular saw coupled to said base plate;

said guide further has trackway means for (a) slidably engaging both of said linear surfaces, (b) guiding said linear surfaces in a translating travel thereof lengthwise of said guide, and (c) preventing lateral displacement of said linear surfaces from said trackway means;

at least a substantial portion of said trackway means is inseparably integral with said guide; and elongate means, coupled to and underlying said planar surface of said guide, for abuttingly receiving a workpiece thereagainst and therealong, for processing of said workpiece by such a circular saw coupled to said base plate.

2. Guiding means, for a circular saw base plate, according to claim 1, wherein:

said portion of said trackway means comprises a single, elongate ledge (a) joined to said planar surface, (b) extending lengthwise of said planar surface, and (c) having a walled passageway formed thereunder; and said passageway comprises means for receiving both of said linear surfaces within said passageway and beneath said single ledge.

3. Guiding means, for a circular saw base plate, according to claim 2, wherein:

said ledge and said planar surface cooperatively define a slotted space therebetween which opens onto said passageway.

4. Guiding means, for a circular saw base plate, according to claim 2, wherein:

said ledge is integral with said planar surface.

5. Guiding means, for a circular saw base plate, according to claim 1, wherein:

said guide comprises an elongate platform having parallel sides, and opposite ends; and said elongate means for abuttingly receiving a workpiece comprises an extended element, having a right-angular cross-section, removably coupled to an end of said platform, for facilitating cross-cutting of a workpiece by a circular saw coupled to said base plate.

* * * * *